United States Patent [19]
Priem et al.

[11] Patent Number: 5,334,998
[45] Date of Patent: Aug. 2, 1994

[54] METHOD AND APPARATUS FOR UTILIZING BLANKING ON BOTH ZERO SETUP AND PEDESTAL SETUP DISPLAY MONITORS WITH A CONVENTIONAL COMPUTER SYSTEM

[75] Inventors: Curtis Priem, Fremont; Charles Boynton, Palo Alto, both of Calif.

[73] Assignee: Sun Microsystems, Inc., Mountain View, Calif.

[21] Appl. No.: 726,303

[22] Filed: Jul. 5, 1991

[51] Int. Cl.$^5$ .......................... G09G 3/00; H04N 5/16
[52] U.S. Cl. .................... 345/185; 348/441; 348/572; 348/691
[58] Field of Search ............... 340/798, 709, 717, 767, 340/73; 358/34, 158, 165, 168, 221, 171, 172; 315/384, 385; 345/185; 348/441, 572, 691, 555

[56] References Cited

U.S. PATENT DOCUMENTS

| | | | |
|---|---|---|---|
| 4,194,220 | 3/1980 | Frame | 358/221 |
| 4,370,674 | 1/1983 | Johnson et al. | 358/74 |
| 4,631,589 | 12/1986 | Hongu et al. | 358/171 |
| 4,897,801 | 1/1990 | Kazama et al. | 340/717 |
| 4,918,534 | 4/1990 | Lam et al. | 358/163 |
| 4,987,551 | 1/1991 | Garrett, Jr. | 340/734 |
| 5,043,805 | 8/1991 | Citta et al. | 358/83 |
| 5,107,189 | 4/1992 | Page | 358/34 |
| 5,111,284 | 3/1992 | Tsujihara et al. | 358/10 |

FOREIGN PATENT DOCUMENTS

| | | | |
|---|---|---|---|
| 57-212871 | 12/1982 | Japan | 358/165 |
| 1216682 | 8/1989 | Japan | 358/172 |

Primary Examiner—Ulysses Weldon
Assistant Examiner—Amare Mengistu
Attorney, Agent, or Firm—Blakely Sokoloff Taylor & Zafman

[57] ABSTRACT

In a computer system having a frame buffer, apparatus for providing an overlay for the frame buffer, and a digital-to-analog converter for furnishing analog signals from the frame buffer to a pedestal setup display monitor, the digital-to-analog converter including apparatus for furnishing a blank level substantially below the lowest level of the analog signal desired to be visible on the monitor during retrace periods when used with a pedestal setup display monitor, the improvement including apparatus for allowing the system to utilize zero setup display monitors including apparatus for disabling the apparatus for furnishing a blank level when the computer system is used with a zero setup display monitor, and apparatus for causing the apparatus for providing an overlay for the frame buffer to furnish signals indicating a black level during retrace periods when the computer system is used with a zero setup display monitor.

14 Claims, 3 Drawing Sheets

METHOD AND APPARATUS FOR UTILIZING BLANKING ON BOTH ZERO SETUP AND PEDESTAL SETUP DISPLAY MONITORS WITH A CONVENTIONAL COMPUTER SYSTEM

BACKGROUND OF THE INVENTION

1. Field Of The Invention

This invention relates to computer systems and, more particularly, to methods and apparatus for providing output signals to control computer monitors which require zero setup blanking and computer monitors which require pedestal setup blanking.

2. History Of The Prior Art

Typically, a computer monitor receives information from a computer system and displays that information in a picture made up of a number of horizontal scan lines on the screen of the monitor. In general, computer monitors accept the information to be displayed as an analog signal which varies from a more negative value to a more positive value. With a grayscale monitor the more negative value represents black while the more positive value represents white. The analog signal is used to modulate the raster beam of the monitor as it scans across the face of the monitor.

Typically, the scan of the raster beam starts at the upper left-hand corner of the monitor and traces a first horizontal line across the display from left to right. The data to be presented on this first line is transferred to the monitor during a period beginning after the receipt of a synchronizing signal and continuing until the line is completed.

When the scan line has been completed, the raster beam must retrace over the monitor screen to a position at which the next line starts. During this retrace interval, the raster beam must not be visible; or it will confuse the display of information on the screen. To make the beam invisible, the value of the analog signal fed to the monitor during the retrace period is typically set at a blank level more negative than the value used to indicate black. Although one would imagine that the level for black would be sufficient to keep the retrace from appearing on the monitor screen, this was not true as a historical fact. When the first television sets were produced using vacuum tubes, it was very difficult to obtain the precise levels necessary for driving the television monitors; a "black" retrace level would often show on the display. Consequently, a blank level lower than the black level was used and continues to be used for both television and computer monitors to assure that the retrace does not appear on the display.

More modern monitor systems than those typically used in the United States, such as European television systems, were designed much later in time and do not require that a more negative setup level be used during the retrace period to accomplish blanking. The blank level is simply set equal to the black level which can be closely controlled with modern components.

It appears to be clear that the United States television and computer industries will soon be using monitors in which the blank level is set to the black level, so called "zero-setup" monitors. The reasons for such a conclusion are economic. In order to provide blanking at a pedestal level more negative than the color black which the video circuit of a monitor expects to be at ground, it is necessary for the digital-to-analog converter circuitry of the computer system to include circuitry to generate the pedestal level between blank and black to boost the black level above ground. Then, it is necessary to provide additional circuitry at the monitor to provide an equal level which may be subtracted from the signal provided as input to the monitor so that an accurate black at ground level may be produced. Both items of circuitry have a cost.

Moreover, although the circuitry in the monitor may be made to produce a level very accurately, a current generator is typically used in the computer system which is usually an integrated circuit. It is very difficult to accurately control the value of the current generated by such circuitry. In fact, the current values generated by such circuitry may vary by fifty percent from the desired values. The effect of this variance is that the pedestal level for blanking from which a constant value is subtracted at the monitor may cause the black level to be too negative and clip the signal making all the dark grays become black or too positive so that a gray signal is provided for the black level making black become a dark gray. Thus, the present arrangement provides costly circuitry which actually makes the system operate less accurately than it would without the circuitry.

Although it is clear that the industry is headed toward zero setup level monitors, it is not yet there. Consequently, it would be useful during the period until such monitors become the standard that a computer system be capable of operating using presently available circuitry with both those monitors providing a pedestal level for blanking and those providing a zero setup level. This requires that the digital-to-analog converter circuitry at the output of the computer display system be capable of furnishing either data signals dropping from a pedestal level to a blanking level during horizontal retrace or data signals assuming a black level during horizontal retrace. It would also be desirable to attain such a result with minimal changes to the digital-to-analog converter circuitry presently available.

SUMMARY OF THE INVENTION

It is, therefore, an object of the present invention to provide a computer system capable of furnishing analog data signals to a display monitor which signals may either incorporate a pedestal level to be used for retrace blanking or not incorporate such a level.

It is another more specific object of the present invention to provide a computer system capable of furnishing analog data signals to a display monitor which may either incorporate a pedestal level to be used for retrace blanking or not incorporate such a level, using the digital-to-analog converter circuitry presently available within the typical computer system.

These and other objects of the present invention are realized in a computer system having a frame buffer, means for providing an overlay for the frame buffer, and a digital-to-analog converter for furnishing analog signals from the frame buffer to a pedestal setup display monitor, the digital-to-analog converter including means for furnishing a blank level substantially more negative than the lowest level of the analog signal desired to be visible on the monitor during retrace periods when used with a pedestal setup display monitor, by the improvement including apparatus for allowing the system to utilize zero setup display monitors comprising means for disabling the means for furnishing a blank level when the computer system is used with a zero setup display monitor, and means for causing the means for providing an overlay for the frame buffer to furnish signals indicating a black level during retrace periods when the computer system is used with a zero setup display monitor.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Figure 1:
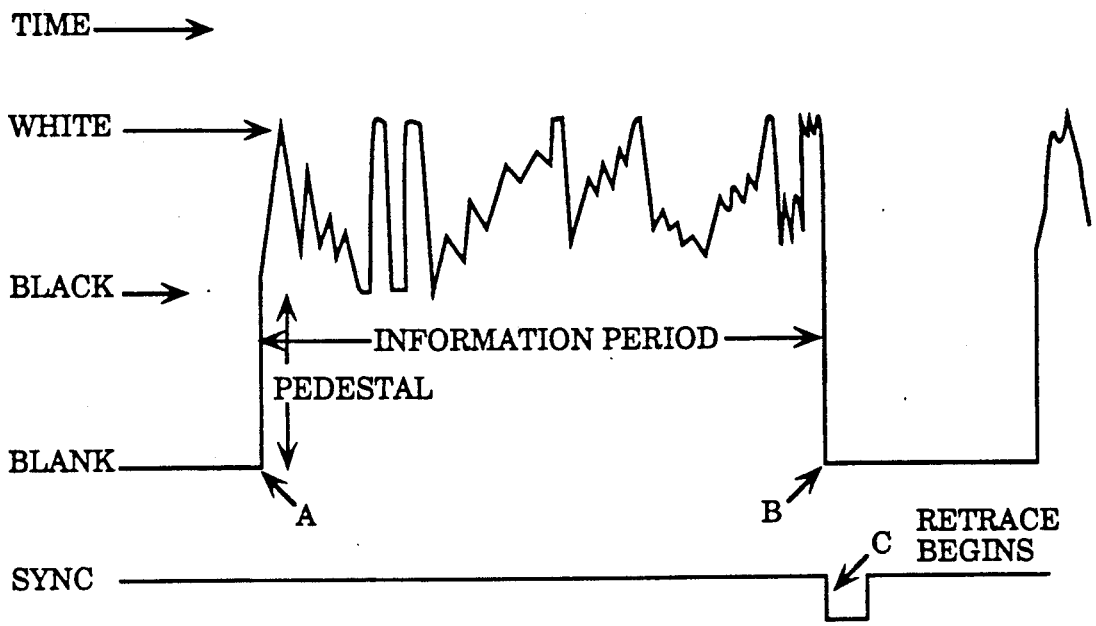
FIG. 1 is a diagram illustrating the signals provided to a computer monitor which utilizes a pedestal setup level for retrace blanking.

FIG. 1 is a diagram illustrating an analog signal provided at the output of digital-to-analog converter circuitry of the display circuitry of a typical computer system. Also shown is an independent synchronization signal. The analog signal is furnished to a computer output monitor so that it may display the results of an operation carried out by the computer system. The information carrying portion (from point A to point B) of the signal furnished by the digital-to analog converter varies between a more positive level which is intended to represent white in a grayscale system and a more negative level which is intended to represent black. This information-carrying portion of the signal is that used to direct the raster beam to display information during a single left-to-right scan of one horizontal line on the display.

As may be seen, at the left edge of the analog signal below the level which should represent black is shown a blank level. In a typical system utilizing a pedestal setup level, the blank level of the analog signal furnished at the output of the digital-to analog converter differs from the black level by an amount termed a pedestal. At the right edge of the information carrying portion at point B of the analog signal, the analog signal drops to the more negative blank level. At some point C following point B, in response to an independent synchronization signal, the retrace operation begins. During the retrace operation, the signal from the digital-to analog converter is cut off, and the signal furnished for driving the raster beam while it retraces the face of the monitor screen remains at the blank level. At the completion of the retrace operation, the blank level is removed; and data is again transferred to the monitor during the next scan line.

As may be seen in FIG. 1, the blank level furnished at the output of the digital-to analog converter is substantially more negative than the black level. As explained above, historically it was necessary to provide a pedestal for black above the blank level so that the raster beam retrace would not show on the monitor. At the monitor, the pedestal level was subtracted to bring the black level back to the correct value at the input to the video circuitry. However, computer and television monitors are now sufficiently accurate that the pedestal level is unnecessary. The raster beam may simply be set to the black level of the monitor, and it will not show during the retrace.

Figure 2:
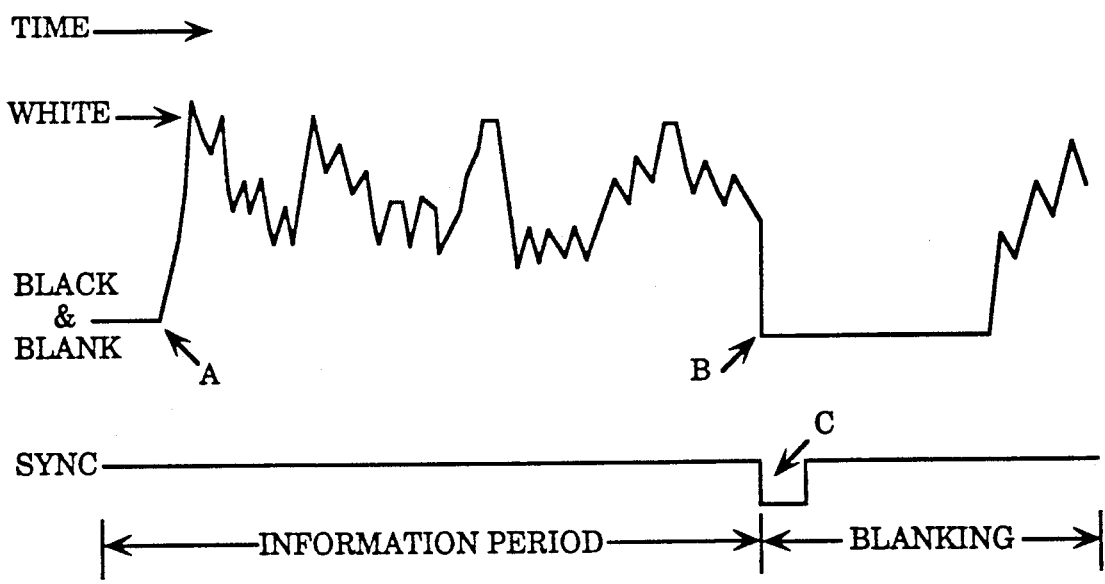
FIG. 2 is a diagram illustrating the signals provided to a computer monitor which does not utilize a pedestal setup level for retrace blanking.

FIG. 2 illustrates the output signal from a system (such as the standard system used in Europe) which does not incorporate a blanking level. As may be seen, the analog signal includes the information-carrying portion in which the signal varies between the black and white levels and a blanking portion in which the signal remains at the black level. As is the case in FIG. 1, at some point C, in response to an independent synchronization signal, the retrace operation begins.

Figure 3:
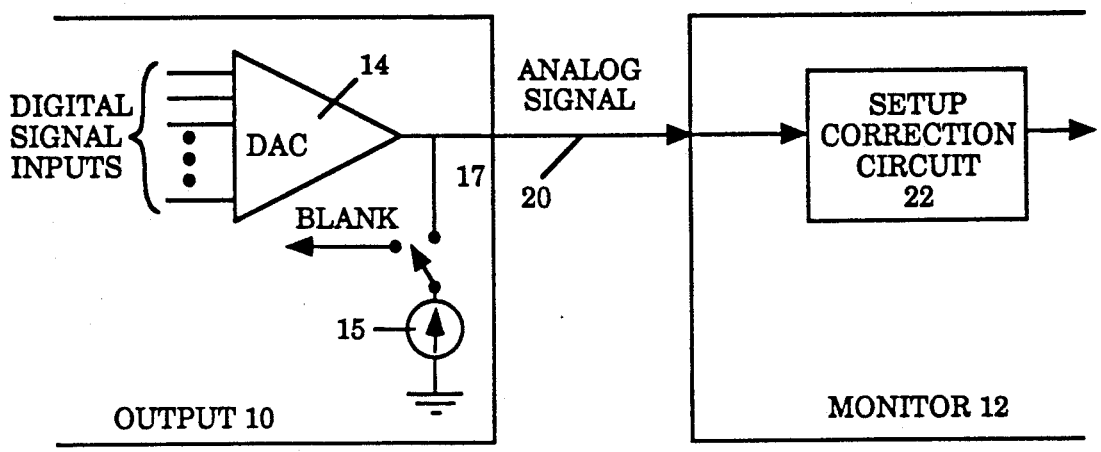
FIG. 3 is a block diagram illustrating the basic elements of circuitry for providing a pedestal setup level.

FIG. 3 illustrates in block diagram the output portion 10 of a typical computer system which may be used to provide the analog signals described in FIG. 1 to a display monitor. FIG. 3 also shows block 12 which represents circuitry of one or more types at the monitor which receives the analog signal from the computer system and uses it to provide the output display for the computer system. As may be seen, the circuit 10 includes a digital-to-analog converter (DAC) 14 which receives the digital signals from the computer system (not shown) and converts those signals to analog signals in a manner well known to those skilled in the art. The digital-to-analog converter 14 may receive grayscale signals for conversion and transfer those signals as a single analog output signal.

Considering a grayscale system for explanation purposes, a first current generator 15 is used to provide a current level which may be used to furnish the pedestal level above the blank level used by the typical monitor to fix the level of black. This pedestal level is furnished during the period of the active scan in which data is being provided to the display. A blank control signal may be furnished to open a switch 17 and causes the pedestal level from the generator 15 to be turned off during the blanking period. Thus the pedestal level is added to the analog signal from the digital-to-analog converter 14 during the active information period and is not present during the blank period. It should be noted that although the outputs of the digital-to-analog converter 14 and the current generator 15 are current values, these are typically converted to voltages across a termination resistor in the monitor. In any case, the general shape of the analog signal furnished to the monitor will be the same whether considered as a current or a voltage signal. For the purpose of this explanation, a synchronizing signal which initiates the retrace period is provided from the computer to the monitor as a separate signal although it may be otherwise provided in certain systems as a part of the analog signal.

In the circuitry at the monitor, the analog signal is received from the computer system via a connecting cable 20. A correction amount equal to the pedestal value is subtracted by any of various well known arrangements to produce the analog signal which drives the raster beam during the active period of the scan. The correction amount is a value which is set generally as a factory adjustment and may be very accurately determined. Theoretically, the correction amount is equal to the pedestal level although, as pointed out, the pedestal levels generated by the digital-to-analog converter may vary widely.

Thus, during the period of the active scan, the pedestal level is furnished to the analog signal from the digital-to-analog converter 14, and the correction amount is subtracted from the signal received at the setup correction circuit 22. Theoretically, this places the black level at ground in the video circuitry of the monitor; and the result is furnished to the computer monitor as the black reference level for the monitor. The value provided is used during the scan line to provide an accurate value for the black reference signal during that period.

On the other hand, during the retrace interval, the pedestal setup level provided by the generator 15 on the cable 20 is disabled so that the signal furnished to the monitor falls to the blank level below the black level. The correction amount is removed from the blank level producing a signal which is more negative than the black level. This assures that the retrace will not show on the display.

However, it is very difficult using digital integrated circuits to construct a current generator 15 which provides an accurate output signal. In fact, the level provided may easily vary by fifty percent from its nominal value. Consequently, the pedestal level provided at the input to the circuit 12 to determine the color black at the monitor may vary substantially from the pedestal level expected. On the other hand, it is not difficult for a monitor manufacturer to provide an accurate setting for the correction value since this value is essentially dialed in at the factory. When the correction amount is subtracted from whatever signal is provided on conductor 20 during the active scan, a black reference level produced could be more positive than expected so the data signals furnished to the monitor are clipped to black. Just as often, the black reference level is more negative than expected so that signals to the monitor contain no real blacks but only dark grays.

Figure 4:
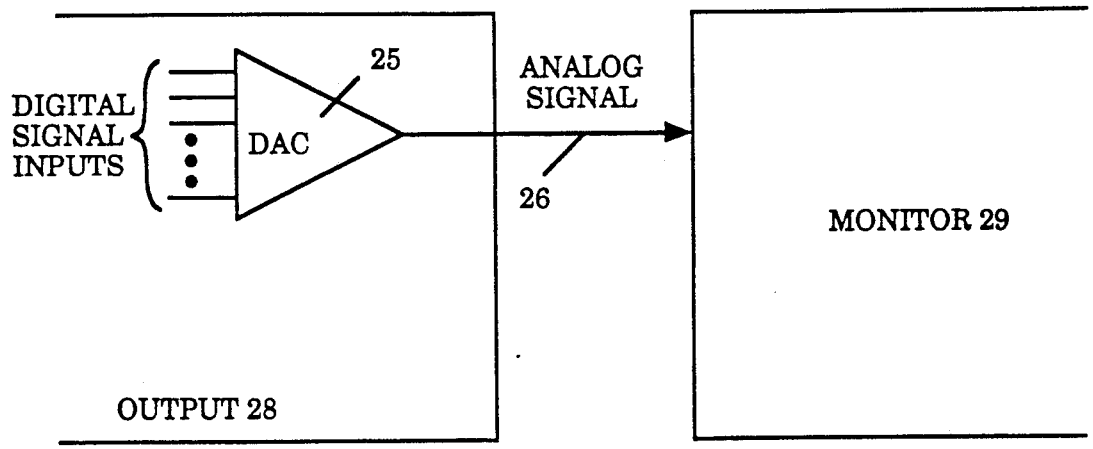
FIG. 4 is a block diagram illustrating the basic elements of circuitry which provides a zero setup level.

FIG. 4 illustrates a circuit constructed in accordance with more modern standards to eliminate the pedestal setup level and provide retrace blanking at the black level of the monitor. The circuit provides the signals illustrated in FIG. 2. As may be seen, the digital-to-analog converter (DAC) 25 receives the digital data signals, converts them to analog, and transfers those signal via a cable 26 to the video circuit of the monitor. No source of a pedestal level is provided. Moreover, a correction amount for bringing the input signal back to the internal black level of the monitor 29 is not needed in the monitor because the blank level remains at the black level during the retrace period.

In order to provide for operation with either type of monitor, a blank control signal is provided by the computer during any retrace period. When used with a pedestal setup monitor, this signal causes the digital-to-analog converter to furnish the pedestal level signal necessary for that type of monitor and to remove the pedestal level during the retrace period. On the other hand, when used with a zero setup monitor, the blank signal causes the computer to utilize available circuitry to generate signals indicating a black level during the blanking period.

Figure 5:
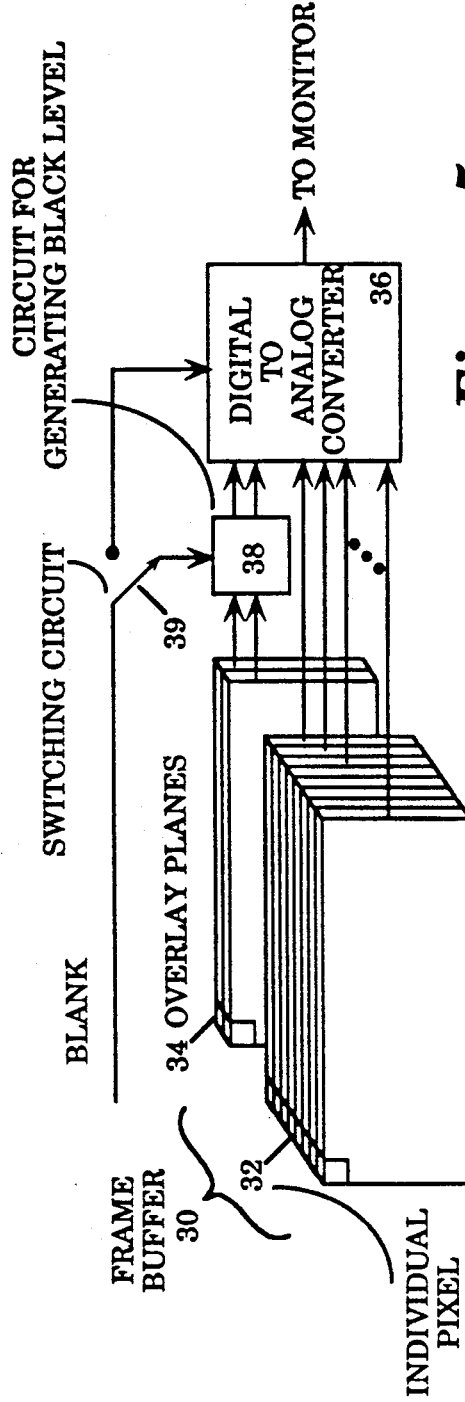
FIG. 5 is a diagram illustrating the basic elements of circuitry in accordance with the present invention for providing either a pedestal setup level or a zero setup level as a part of the analog signal directed to the monitor.

FIG. 5 illustrates an arrangement in accordance with the present invention for allowing a computer system to operate with monitors which provide a pedestal setup level for blanking and with monitors which provide no pedestal setup level for blanking. The circuitry illustrated in block form comprises a typical frame buffer 30 used in computer systems to store the output to be furnished to a bit mapped display. The frame buffer 30 illustrated is comprised of ten individual planes of video random access memory (VRAM), eight of which are used to store the individual bits of data which together form each pixel to be displayed on the monitor screen. The two other planes of video random access memory are used to provide an overlay for the display.

As may be seen in FIG. 5, an individual pixel 32 to be displayed on the screen is made up of eight individual bits of data, one bit from each of the data planes of the frame buffer 30. At the same relative position as the eight bits defining the pixel are two bits 34 from each of the overlay planes. Typically these bits are used to store coded binary information defining the manner in which the information at the associated pixel position in the other eight planes is to be treated when displayed. The two bits of data allow four choices for treating the information. It is typical to use the coding 00 to indicate that the associated pixel information in the frame buffer is to be displayed on the screen of the monitor without change. Thus, a particular black and white shade would be displayed when the overlay bits for the pixel position are 00. The code 01 is typically utilized to indicate an overlay color (referred to as "color 1") which may be used to construct a cursor or to indicate a foreground or background color. The code 10 (referred to as "color 2") is typically not utilized in computer systems. The code 11 is typically utilized to indicate a second overlay color (referred to as "color 3") which may also be used to construct a cursor or as a foreground or background color.

When used with a pedestal setup monitor, the digital-to-analog converter 36 transfers an analog signal incorporating a pedestal level. During any retrace period, a blank control signal is provided by the computer. This blank signal is transferred by a switching circuit 39 to the digital-to-analog converter 36, a circuit essentially like circuit 10 of FIG. 3. The blank signal causes the digital-to-analog converter 36 to furnish the blank level below black described above by disabling the pedestal generator during the blanking period.

However, the system may also be used with zero setup monitors. Since the overlay planes have available a coding 10 indicating "color 2" which is typically unused, the coding 10 may be utilized to indicate that the color black is to be furnished to the display. This is accomplished by utilizing the blank signal to turn on the circuit 38 to generate color 2 during the blanking period. This coding is furnished at each position of the display during the retrace period instead of the values in the overlay plane, and the blanking signal directed to the digital-to-analog converter 36 is disabled. Thus, the analog signal transferred to the monitor indicates that color 2, the black level, is to be transferred to the monitor. The black level signal assures that the retrace of the raster beam is not shown on the display.

Consequently, when used with a zero setup monitor, the system is set up to operate in a first mode in which the blank signal is not sent to the digital-to-analog converter 36 but blanking is provided by circuit 38 generating a black-level-indicating code.

Figure 6:
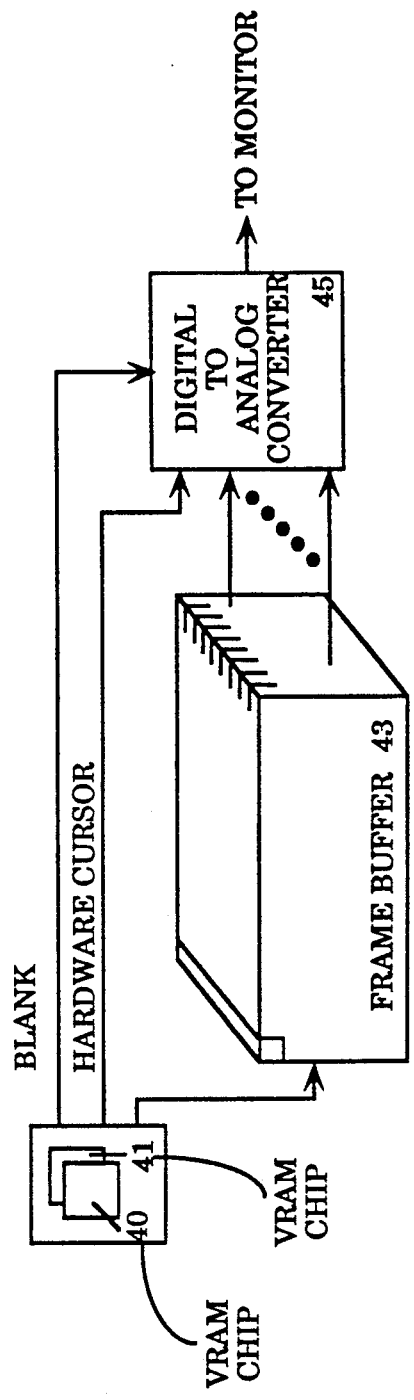
FIG. 6 is a diagram illustrating the basic elements of a second circuit in accordance with the present invention for providing either a pedestal setup level or a zero setup level as a part of the analog signal directed to the monitor.

FIG. 6 illustrates a second system utilizing the present invention so that display systems may use a conventional digital-to-analog converter with both zero setup monitors and monitors operating with a pedestal setup level. The system illustrated in FIG. 6 is one in which the two overlay planes of a frame buffer typically used to create cursors have been replaced by a pair of VRAM chips 40 and 41 each capable of storing an array of 32 bits by 32 bits in a preferred embodiment. These chips are used to store more economically the cursor image than the two planes used in the arrangement of FIG. 5. In such a system, the logical position of the cursor relative to each pixel position is determined by control circuitry which is well known in the art and which indicates the horizontal and vertical positions and coverage of the cursor array.

In the typical operation of the circuit of FIG. 6, for each pixel in a frame buffer 43 to be displayed, the cursor position is checked to determine whether the pixel is within the cursor area. If outside the cursor area, the code 00 is presented to the digital-to-analog converter 45 so that the pixel value in the frame buffer 43 is displayed.

Within the cursor region, the chips 40 and 41 provide the same four code possibilities which are used in the same manner as in the system with two overlay planes shown in FIG. 5. Since these chips 40 and 41 store and use the same codes in the same manner as do the overlay planes, the binary code 10 (color 2) is available. This code may be utilized to provide a black blanking level when the computer system is used with a monitor having a zero setup level for blanking during retrace. When such a system is used with a zero setup monitor, during the retrace period the blanking signal to the digital-to-analog converter 45 is disabled. Then, all of the overlay positions controlled by the values in the chips 40 and 41 are set to the value 10 so that the color black is furnished to the digital-to-analog converter 45. This signal is then sent to the digital-to-analog converter 45 as the analog value during the period of the retrace. This signal is used as is the signal furnished by the circuit 38 of FIG. 5 to provide a black level used for blanking with zero setup monitors. On the other hand, when used with a pedestal setup level monitor, the blank signal is furnished to the digital-to-analog converter 45 to provide blanking during retrace. It should also be noted that this method of blanking may function during either horizontal or vertical retrace periods for either the system of FIG. 5 or the system of FIG. 6.

As will be understood by those skilled in the art, the present invention allows the use of the typical digital-to-analog converter circuitry without modification for providing signals to both pedestal setup monitors and zero setup monitors. Such an arrangement is particularly inexpensive and advantageous during a period of change from one type of monitor to another.

Although the present invention has been described in terms of a preferred embodiment, it will be appreciated that various modifications and alterations might be made by those skilled in the art without departing from the spirit and scope of the invention. For example, the invention has been described throughout in the context of a grayscale monitor. It will be apparent to those skilled in the art that the arrangement could as well be used with color monitors by providing identical circuitry to that described for each of the red, green, and blue colors. Moreover, the circuitry has been described in an arrangement in which the synchronization signal is provided as a signal independent of the analog signal while those skilled in the art will recognize that the synchronization signal is often provided as a more negative analog value on the data input lines. In a color system, this more negative signal which may be used for the synchronization signal is usually transferred only on the green portion of the RGB color signal and is referred to as a "synch-on-green" signal. The invention could be used in such a system without change. The invention should therefore be measured in terms of the claims which follow.

What is claimed is:

1. In a computer system having a frame buffer, means for providing an overlay for the frame buffer, a digital-to analog converter for furnishing analog signals from the frame buffer to a pedestal setup display monitor, and means for furnishing a blank level at a level substantially below the lowest level of the analog signal desired to be visible on the monitor during retrace periods when used with a pedestal setup display monitor, the improvement comprising apparatus for allowing the system to utilize zero setup display monitors, said apparatus comprising means for disabling the means for furnishing a blank level when the computer system is used with a zero setup display monitor, and means for causing the means for providing an overlay for the frame buffer to furnish signals indicating a black level during retrace periods when the computer system is used with a zero setup display monitor.

2. In a computer system as claimed in claim 1 in which the means for providing an overlay for the frame buffer comprises a pair of overlay planes each having essentially the same number of storage positions as pixels to be presented on the display, the means for causing the means for providing an overlay for the frame buffer to furnish signals indicating a black level during retrace periods when the computer system is used with a zero setup display monitor comprising means for storing binary signals indicating the color black at each position of retrace in the overlay planes during a retrace operation.

3. In a computer system as claimed in claim 1 in which the means for providing an overlay for the frame buffer comprises a pair of hardware cursor arrays sufficient to store the features of a cursor, the means for causing the means for providing an overlay for the frame buffer to furnish signals indicating a black level during retrace periods when the computer system is used with a zero setup display monitor comprising means for storing binary signals indicating the color black at each position of the hardware cursor arrays during a retrace operation.

4. In a computer system as claimed in claim 1 further comprising means for furnishing a synch-on-green synchronization signal to initiate the retrace operation.

5. In a computer system as claimed in claim 1 further comprising means for furnishing a synchronization signal independent of the analog data signal to initiate the retrace operation.

6. A method for allowing a computer system having a frame buffer, apparatus for providing an overlay for the frame buffer, a digital-to-analog converter for furnishing analog signals from the frame buffer to a pedestal level blanking display monitor, and apparatus for furnishing a blank level substantially below the lowest level of the analog signal desired to be visible on the monitor during retrace periods when used with a pedestal setup display monitor, to utilize zero setup display monitors comprising the steps of disabling the apparatus for furnishing a blank level when the computer system is used with a zero setup display monitor, and causing the apparatus for providing an overlay for the frame buffer to furnish signals indicating a black level during retrace periods when the computer system is used with a zero setup display monitor.

7. A method as claimed in claim 6 for a computer system in which the apparatus for providing an overlay for the frame buffer includes a pair for overlay planes of memory in which the step of causing the apparatus for providing an overlay for the frame buffer to furnish signals indicating a black level during retrace periods when the computer system is used with a zero setup display monitor comprises storing signals indicating a black level in the pair of overlay planes of memory.

8. A method as claimed in claim 6 for a computer system in which the apparatus for providing an overlay for the frame buffer includes a pair of hardware cursor arrays sufficient to store the features of a cursor in which the step of causing the apparatus for providing an overlay for the frame buffer to furnish signals indicating a black level during retrace periods when the computer system is used with a zero setup display monitor comprises storing signals indicating a black level in the pair of hardware cursor arrays.

9. A computer system capable of providing appropriate analog outputs to both a zero-setup display monitor and a pedestal setup display monitor comprising:
a digital-to-analog converter (DAC) including means for receiving a first plurality of digital signals, means for receiving a second plurality of digital signals, and means for outputting analog signals;
frame buffer means coupled to said means for receiving a first plurality of digital signals;
frame buffer overlay means coupled to said means for receiving a second plurality of digital signals;
circuit means for generating a black level signal coupled to said frame buffer overlay and said means for receiving a second plurality of digital signals;
means for switchably coupling a blanking signal to either said DAC or said circuit means for generating a black level;
wherein, in the event said computer system is used with a pedestal setup display monitor, said means for switchably coupling a blanking signal couples said blanking signal to said DAC, thereby causing said DAC to output an analog signal appropriate for said pedestal setup display monitor,
wherein, in the event said computer system is used with a zero setup display monitor, said means for switchably coupling a blanking signal couples said blanking signal to said circuit means for generating a black level signal, causing said circuit means to couple said black level signal to said DAC, thereby causing said DAC to output an analog signal appropriate for said zero setup display monitor.

10. The computer system capable of providing appropriate analog outputs to both a zero-setup display monitor and a pedestal setup display monitor as provided in claim 9, wherein said frame buffer comprises video random access memory.

11. The computer system capable of providing appropriate analog outputs to both a zero-setup display monitor and a pedestal setup display monitor as provided in claim 9, wherein,
said frame buffer comprises means for storing pixel data; and
said frame buffer overlay comprises means for defining whether particular pixel data should be overlaid with an overlay color.

12. The computer system capable of providing appropriate analog outputs to both a zero-setup display monitor and a pedestal setup display monitor as provided in claim 11, wherein said black level signal comprises a binary coded signal corresponding to a black overlay color.

13. The computer system capable of providing appropriate analog outputs to both a zero-setup display monitor and a pedestal setup display monitor as provided in claim 11, wherein said means for defining whether particular pixel data should be overlayed comprises a first bit buffer and a second bit buffer.

14. The computer system capable of providing appropriate analog outputs to both a zero-setup display monitor and a pedestal setup display monitor as provided in claim 13, wherein said black level signal comprises a binary coded signal having a logical zero in said first bit buffer, and a logical one in said second bit buffer.

* * * * *

UNITED STATES PATENT AND TRADEMARK OFFICE
CERTIFICATE OF CORRECTION

PATENT NO. : 5,334,998
DATED : 08/02/94
INVENTOR(S) : Priem, et al

It is certified that error appears in the above-indentified patent and that said Letters Patent is hereby corrected as shown below:

ON THE TITLE PAGE:

[75] Inventors: delete "Curtis Priem, Fremont; Charles Boynton, Palo Alto, both of Calif." and insert --Curtis Priem, Fremont; Charles Poynton, Palo Alto, both of Calif.--

Signed and Sealed this

Eleventh Day of October, 1994

Attest:

BRUCE LEHMAN

Attesting Officer     Commissioner of Patents and Trademarks